(12) United States Patent
Hogan et al.

(10) Patent No.: US 10,656,940 B1
(45) Date of Patent: May 19, 2020

(54) SYSTEMS, DEVICES, AND METHODS FOR SOURCE CODE GENERATION FROM BINARY FILES

(71) Applicant: ARCHITECTURE TECHNOLOGY CORPORATION, Eden Prairie, MN (US)

(72) Inventors: Jason Hogan, Eden Prairie, MN (US); Judson Powers, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 0 days.

(21) Appl. No.: 16/267,217

(22) Filed: Feb. 4, 2019

(51) Int. Cl.
| | | |
|---|---|---|
| *G06F 8/74* | (2018.01) | |
| *G06F 8/73* | (2018.01) | |
| *G06N 3/02* | (2006.01) | |
| *G06F 8/41* | (2018.01) | |
| *G06F 8/30* | (2018.01) | |

(52) U.S. Cl.
CPC ............... *G06F 8/74* (2013.01); *G06F 8/37* (2013.01); *G06F 8/41* (2013.01); *G06F 8/73* (2013.01); *G06N 3/02* (2013.01)

(58) Field of Classification Search
CPC ...................................................... G06F 8/53
See application file for complete search history.

(56) References Cited

U.S. PATENT DOCUMENTS

2019/0156184 A1* 5/2019 Le ........................... G06N 3/08

FOREIGN PATENT DOCUMENTS

EP 2650785 A1 * 10/2013 ............. G06F 8/53

OTHER PUBLICATIONS

Hongfa Xue et al.; Machine Learning-Based Analysis of Program Binaries: A Comprehensive Study; IEEE; pp. 65889-65912; retrieved on Jan. 3, 2020 (Year: 2019).*
Ramakrishnan Venkitaraman et al.; Static Program Analysis of Embedded Executable Assembly Code; ACM; pp. 157-166; retrieved on Jan. 3, 2020 (Year: 2004).*
Jason Hogan, Phase I SBIR Proposal, "REVENG—A Reverse Engineering Platform", Topic Number and Name: A18-047 Development of Tools to Derive High Level Language Code Associated with Executable Software, Architecture Technology Corporation, Feb. 7, 2019, 24 pages.

* cited by examiner

*Primary Examiner* — S. Sough
*Assistant Examiner* — Cuong V Luu
(74) *Attorney, Agent, or Firm* — Eric L. Sophir; Foley & Lardner LLP

(57) ABSTRACT

Described herein are various computing technologies for various reverse engineering platforms capable of outputting (e.g., creating, generating) a human readable and high level source code (e.g., C formatted text, Fortran formatted text, LISP formatted text, BASIC formatted text) from various binary files (e.g., application binary file, executable binary file, data binary file) in its original language, as developed before compilation. For example, some of such reverse engineering platforms can be programmed to disassemble binary files from different process architectures, identify various code optimizations as compiler introduced, reverse or unwind various compiler optimizations (de-optimize), and generate a human readable and high-level source code from de-optimized data. These techniques can be technically beneficial for design recovery purposes (e.g., security auditing, digital rights management, driver engineering).

20 Claims, 4 Drawing Sheets

SYSTEMS, DEVICES, AND METHODS FOR SOURCE CODE GENERATION FROM BINARY FILES

TECHNICAL FIELD

This disclosure relates to generating source code from binary files.

BACKGROUND

A programmer can input (e.g., keyboard, microphone) a set of source code (e.g., C++ formatted text, Delphi formatted text) into an integrated development environment (IDE) having a compiler (e.g., Visual Studio, Borland). Then, the programmer can request the compiler to compile the set of source code into a binary file (e.g., executable binary file). Subsequently, a researcher having access to the binary file may want to reverse engineer the binary file into the set of source code for design recovery purposes (e.g., security auditing, digital rights management, driver engineering). However, the source code may be unavailable to the researcher due to limitations on contractual data rights, use of legacy software components, inclusion of third party libraries, or code obfuscation. Resultantly, the researcher can use an analytical tool (e.g., bus analyzer, packet sniffer), a disassembler, or a decompiler in order to understand how the binary file operates or in order to access the set of source code. However, these approaches are technically problematic for several reasons.

First, the analytical tool can often produce false positives, which divert the researcher in unnecessary or undesired ways. As such, the researcher still needs to analyze the set of source code and verify the set of source code as being sourced from the binary file. Therefore, this approach is unreliable, time-consuming, and laborious.

Second, since the disassembler disassembles the binary file into a set of raw machine code, which is relatively complicated, the researcher also needs to be skilled in understanding the set of raw machine code. This skillset is generally rare. Further, even if the researcher is skilled in understanding the set of raw machine code, the researcher may still spend an excessive amount of time/resources in analyzing the set of raw machine code, especially when the binary file involves complex/dependent computation (e.g., graphics, compilers, gaming, simulation, medical software). Additionally, the disassembler generally tends to target a specific hardware architecture (e.g., x86, ARM), thereby making disassembly difficult if the binary file is compiled for a hardware architecture that is different from what the disassembler has targeted originally.

Third, the decompiler rarely, if ever, produces an output that closely resembles the set of source code that was originally input by the programmer, especially when the binary file involves complex/dependent computation (e.g., graphics, compilers, gaming, simulation, medical software). Usually, the output is a mangled version of the set of source code. At best, the output can be functionally equivalent to the set of source code, but usually is structurally different therefrom. One potential reason why the output may be structurally different from the set of source code, as originally input into the IDE, may be due to the compiler optimizing the set of source code for various purposes (e.g., minimize execution time, minimize memory usage, minimize power usage). For example, when the compiler compiles the set of source code for a specific computing architecture, then the compiler performs various optimizations particular to that computing architecture (e.g., minimize application size on disk, increase execution speed). Some examples of particular optimizations can include loop optimization, data flow optimization, code generation, or others. For example, a while loop written in a C programming language may be expanded or unrolled in order to eliminate at least some extra instructions that may decrease an execution speed of a resulting binary file. Subsequently, if that binary file is disassembled and ultimately decompiled, then a resulting set of high-level source code more closely resembles a low-level assembly language source code than the set of source code that was written by the programmer, especially when the binary file involves complex/dependent computation (e.g., graphics, compilers, gaming, simulation, medical software). Furthermore, the decompiler may only target a specific programming language. Therefore, the decompiler may be unable to generate a high level source code in a programming language that the binary file was originally written in, i.e., the set of source code.

SUMMARY

Described herein are various computing technologies for various reverse engineering platforms capable of outputting (e.g., creating, generating) a human readable and high level source code (e.g., C formatted text, Fortran formatted text, LISP formatted text, BASIC formatted text) from various binary files (e.g., application binary file, executable binary file, data binary file) in its original language, as developed before compilation. For example, some of such reverse engineering platforms can be programmed to disassemble binary files from different process architectures, identify various code optimizations as compiler introduced, reverse or unwind various compiler optimizations (de-optimize), and generate a human readable and high-level source code from de-optimized data. These techniques can be technically beneficial for design recovery purposes (e.g., security auditing, digital rights management, driver engineering).

In an embodiment, a method comprises identifying, by a processor, a predetermined machine code string embedded in an binary file; disassembling, by the processor, the binary file such that an assembly language set is generated; inputting, by the processor, the assembly language set to a front end of a multistage compiler such that the front end generates an abstract syntax tree, wherein the multistage compiler includes a back end; inputting, by the processor, the abstract syntax tree into an artificial neural network such that the artificial neural network identifies a compiler optimization in the abstract syntax tree; de-optimizing, by the processor, the abstract syntax tree such that the compiler optimization is removed and a transformed abstract syntax tree is generated without the compiler optimization; and inputting, by the processor, the transformed abstract syntax tree to the back end such that the back end generates a high level source code based on the predetermined machine code string, wherein the high level source code corresponds to the binary file.

In another embodiment, a system comprises a server programmed to: identify a predetermined machine code string embedded in an binary file; disassemble the binary file such that an assembly language set is generated; input the assembly language set to a front end of a multistage compiler such that the front end generates an abstract syntax tree, wherein the multistage compiler includes a back end; input the abstract syntax tree into an artificial neural network such that the artificial neural network identifies a compiler optimization in the abstract syntax tree; de-optimize the abstract syntax tree such that the compiler optimization is removed and a transformed abstract syntax tree is generated without the compiler optimization; and input the transformed abstract syntax tree to the back end such that the back end generates a high level source code based on the predetermined machine code string, wherein the high level source code corresponds to the binary file.

DETAILED DESCRIPTION

This disclosure discloses various computing technologies for various reverse engineering platforms capable of outputting (e.g., creating, generating) a human readable and high level source code (e.g., C formatted text, Fortran formatted text, LISP formatted text, BASIC formatted text) from various binary files (e.g., application binary file, executable binary file, data binary file) in its original language, as developed before compilation. For example, some of such reverse engineering platforms can be programmed to disassemble binary files from different process architectures, identify various code optimizations as compiler introduced, reverse or unwind various compiler optimizations (de-optimize), and generate a human readable and high-level source code from de-optimized data. For example, some of such reverse engineering platforms can be programmed to reverse or unwind various compiler optimizations (de-optimize) based on rewriting or replacing some optimized nodes of an abstract syntax tree with equivalent de-optimized nodes. These techniques can be technically beneficial for design recovery purposes (e.g., security auditing, digital rights management, driver engineering). This disclosure is now described more fully with reference to FIGS. 1-4, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Moreover, note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Figure 1:
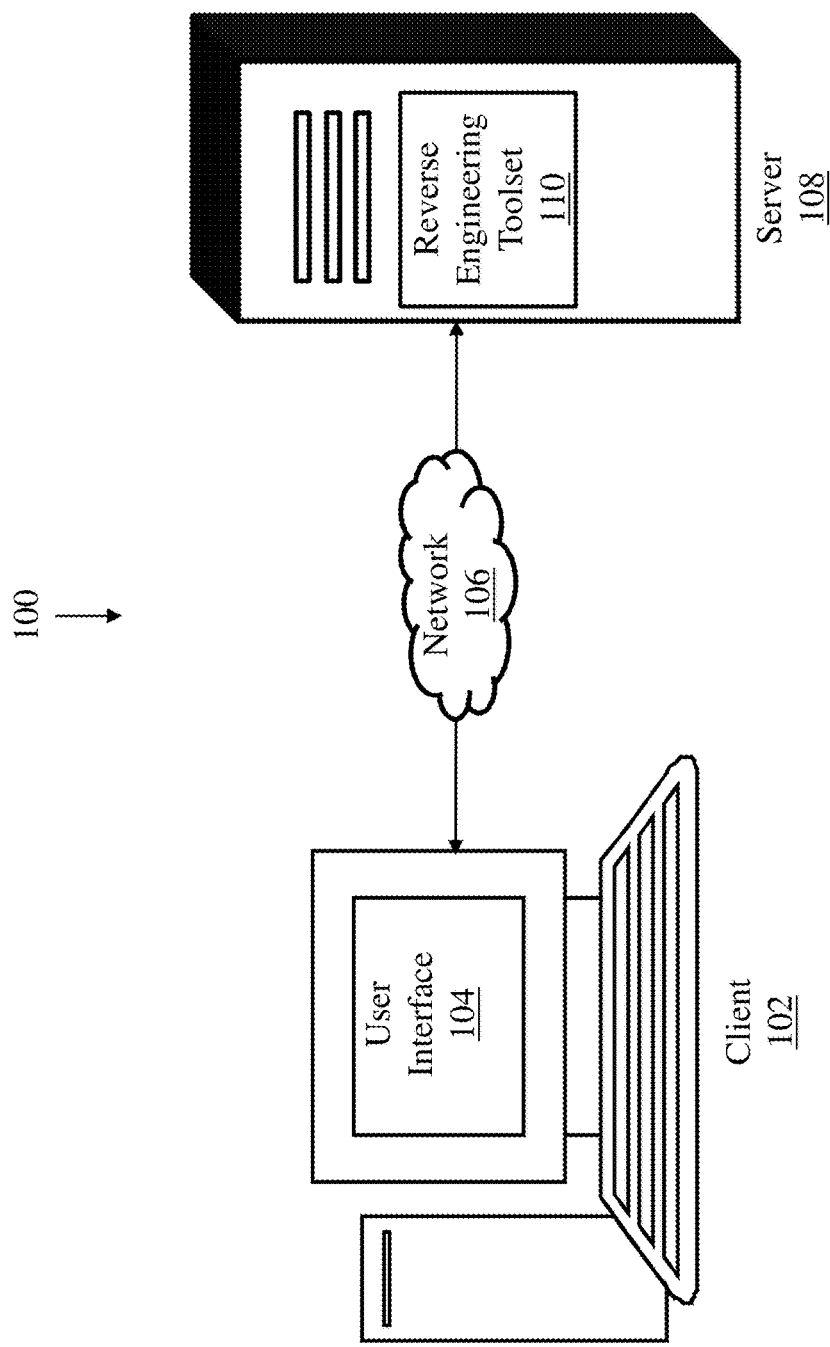
FIG. 1 shows a schematic diagram of an embodiment of a system for generating a high level source code, according to an embodiment.

FIG. 1 shows a schematic diagram of an embodiment of a system for generating a high level source code according to this disclosure. In particular, a system 100 includes a client 102, a network 106, and a server 108. The client 102 is programmed to present a user interface 104. The server 108 is programmed to host a reverse engineering toolset 110. The client 102 and the server 108 are programmed to communicate with each other through the network 106.

The client 102 can be embodied as a desktop, laptop, tablet, smartphone, or another computing device. The client 102 can be programmed to run an operating system (OS) and an application (e.g., browser, IDE application) on the OS, either or both of which can be programmed to present the user interface 104. The server 108 can be embodied as a web server, an application server, a database server, a virtual server, or other computing device. The network 106 can be embodied as a local area network (LAN), a wide area network (WAN), a cellular network, a satellite network, or another network. The client 102 and the server 108 can be programmed to communicate with each other through the network 106 in a wired manner, a wireless manner, or a waveguide manner. The server 108 can be programmed to run an OS and the reverse engineering toolset 110 on the OS. The reverse engineering toolset 110 can be availed to or be integrated into a network-based IDE engine or framework (e.g., Visual Studio, LLVM). The client 102 can programmed to access (e.g., read, write, modify, delete) the reverse engineering toolset 110 on the server 108 through the network 106. Note that although the system 100 depicts a distributed client/server model, the system 100 can be implemented in other ways, such as a non-client/server model, non-network-based, wholly localized, or others.

Figure 2:
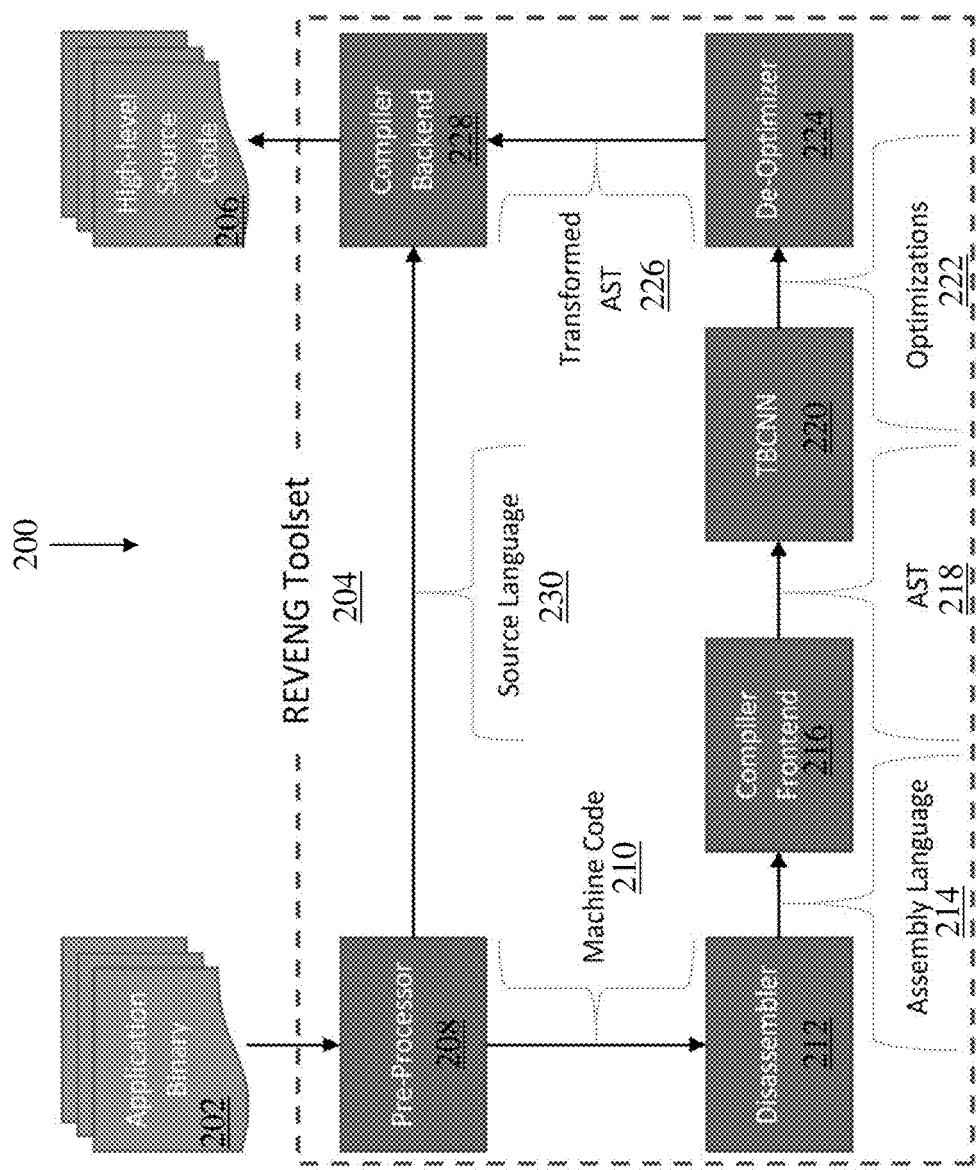
FIG. 2 shows a logical diagram of an embodiment of a system for generating a high level source code from an application binary, according to an embodiment.

FIG. 2 shows a logical diagram of an embodiment of a system for generating a high level source code from an application binary according to this disclosure. In particular, a system 200 includes an application binary 202, a reverse engineering (REVENG) toolset 204, and a high level source code 206. The reverse engineering toolset 204 includes a pre-processor 208, a disassembler 210, a multistage compiler inclusive of a front end 216 and a back end 228, a Tree-Based Convolutional Neural Network (TBCNN) 220, and a de-optimizer 224. The system 200 can be implemented via the system 100. For example, the reverse engineering toolset 110 can include the reverse engineering toolset 204. As such, the server 108 can be programmed to host the application binary 202 and the reverse engineering toolset 204 and thereby generate the high level source code 206 on the server 108 based on various operative commands requested via the client 102 through the network 106. However, note that variations are possible. For example, the application binary 202 can be hosted via the client 102 or the high level source code 206 can be availed to the client 102 over the network 106 or a computing device (e.g., desktop, laptop, workstation, tablet, smartphone) can be programmed to host the application binary 202, the reverse engineering toolset 204, and the high level source code 206.

The application binary 202 can include an application binary file, an executable binary file, a data binary file, or another binary data structure. The application binary 202 can be used for various computing tasks (e.g., graphics, compilers, gaming, simulation, productivity, military applications, medical software). The application binary 202 can be converted into or includes a set of raw or formatted machine code.

The reverse engineering toolset 204 includes the pre-processor 208, the disassembler 210, the multistage complier inclusive of the front end 216 and the back end 228, the TBCNN 218, and the de-optimizer 224. Note that this architecture can vary and the pre-processor 208, the disassembler 210, the multistage complier inclusive of the front end 216 and the back end 228, the TBCNN 218, or the de-optimizer 224 can be external to the reverse engineering toolset 204. Further, note that although the reverse engineering toolset 204 is modular, this architecture can vary and other architectures can be used (e.g., component-based, object-oriented, structured programming, interface programming). Moreover, at least two of the pre-processor 208, the disassembler 210, the multistage complier inclusive of the front end 216 and the back end 228, the TBCNN 218, or the de-optimizer 224 can be a single logical form (e.g., module, object, functional component). Each of the pre-processor 208, the disassembler 212, or the de-optimizer 224 can be embodied as a module, a functional component, a function, an object, or another logical form.

The pre-processor 208 can be programmed to read (e.g., inspect) the application binary 202. The pre-processor 208 can be programmed to output a set of machine code 210 based on the pre-processor 208 reading the application binary 202. The pre-processor 208 can be programmed to identify a text or an alphanumeric string (e.g., code artifact, code snippet, debug symbol, library dependency, library name, compiler identifier, compiler signature) embedded in the application binary 202 or the set of machine code 210 that would give a clue or hint as to how the application binary 202 or the set of machine code 210 was originally created. The clue or hint would be determined against a data store of clues or hints for a particular high level language or library, as stored in the pre-processor 208 or availed to the pre-processor 208. Since a user (e.g., programmer, researcher) desires to generate the set of source code 206 from the application binary 202 or the set of machine code 210, with the set of source code 206 being written in an original programming language into which the application binary 202 was originally compiled, and the user may not know what the original programming language was used in writing the application binary 202, the pre-processor 208 can be programmed to determine/predict/forecast/estimate what the original programming language was used to compile the application binary 202 or the set of machine code 210 based on the text or the alphanumeric string. Stated differently, the pre-processor 208 can be programmed to read the application binary 202 or the set of machine code 210 and determine if there is anything (e.g., text, alphanumeric strings) that can be gleaned from the application binary 202 or the set of machine code 210 in order to determine/predict/forecast/estimate what the original programming language was used in writing the set of source code 206 to compile into the application binary 202 or the set of machine code 210. For example, the pre-processor 208 can search the set of machine code 210 for a predetermined text. The predetermined text, as located, can be compared against a glossary of terms pertaining to a particular high-level language. The glossary can include a set of system libraries commonly included by an application. The set of system libraries (e.g., mere existence) or at least some functions thereof can be used to identify or estimate or forecast a programming language the set of source code 206 was originally written in (e.g., distinguish binary files written in C/C++ versus other languages).

Note that the pre-processor 208 can be omitted when the original programming language that was used in writing the set of source code 206 to compile the application binary 202 is known in advance. As such, the pre-processor 208 can output a source language identifier 230 to the back end 228, which can be used to decompile the application binary 202.

The disassembler 212 can be programmed to disassemble the application binary 202 from machine language into assembly language. The disassembler 212 can be programmed to output a disassembly text in a formatted manner for human-readability rather than suitability for input to an assembler. Some examples of the disassembler can include Binary Ninja, Interactive Disassemlber, OllyDbg, Radare2, Hiew, Capstone, or others. The pre-processor 208, after determining/predicting/forecasting/estimating what the original programming language was used in writing the set of source code 206 to compile the application binary 202, inputs the application binary 202 or the set of machine code 210 into the disassembler 212 such that the disassembler 212 disassembles the set of machine code 210 into a set of assembly language 214. For example, the disassembler 212 can be programmed to support various computing architectures (e.g., ARM, ARM-64, MIPS, PowerPC, SPARC, SystemZ, XCore, and X86 (16-bit, 32-bit, 64-bit)).

The multistage compiler (e.g., single pass, multi pass) can include the front end 216, a middle end, and the back end 228. The middle end can be logically interposed between the front end 216 and the back end 228. Some examples of the multistage compiler include GNU Compiler Collection, LLVM, Amsterdam Compiler Kit, or others. For example, the front end 216 can be embodied as Clang compiler front end.

The multistage compiler can be programmed to include or have access to the TBCNN 218 or the de-optimizer 224. As such, the disassembler 212 inputs the set of assembly language 214 into the front end 216. In response, the front end 216 processes the set of assembly language 214 such that the front end 216 generates an intermediate representation (IR). One example of the IR an Abstract Syntax Tree (AST) 218 with a set of nodes that are inter-branched (e.g., V-shaped, W-shaped). However, note that other forms of IR are possible, such a data structure representative of an abstract syntactic structure of source code.

Since the AST 218 encapsulates a structure of the set of assembly language 214 and presents a visual representation of the application binary 202 or the abstract syntactic structure of source code, the AST 218 can be input into the TBCNN 220 in order to identify, which can include interpreting, various compiler optimizations (e.g., convolution kernel is designed to capture structural information). For example, the TBCNN 220 can be developed using TensorFlow. This can take place by forming a coding layer of the TBCNN 220. The coding layer takes the AST 218 as an input and produces a series of feature vectors, where each feature is a structural element of an application. Upon completing the coding layer, a convolutional layer can be formed. The convolutional layer includes a set of learnable filters, where each filter is a structural feature of an AST. Through convolution, structural features of an application are detected and a new AST is generated. Because applications can vary in size and complexity, the structural features detected cannot be passed directly to a fixed-sized neural layer (although this can be possible). To address this situation, a dynamic pooling layer is created where the dynamic pooling layer consolidates some, most, many, or all of the detected features into a single vector, allowing all features to be fully connected to the subsequent hidden and output layers. An output layer of the TBCNN 220 can denote what compiler optimizations were employed. Additionally, the output layer can highlight at least some optimized nodes of an AST. The TBCNN 220 can be trained to identify machine-independent compiler optimizations (e.g., loop optimizations). As such, the TBCNN 220 can be a trained neural network capable of identifying compiler optimizations from an AST. For example, the TBCNN 220 can be trained to see a node or a cluster of nodes as representative of or a flag for a particular compiler optimization (e.g., while or for loop unrolling). For example, the TBCNN 220 can be trained to identify various structural features of the AST 218 that denote various compiler optimizations. For example, at least some of the structural features can be extracted from the AST 218. One example of training the TBCNN 220 can include the TBCNN 220 learning various code vector representations (e.g., unsupervised learning, supervised learning) based on programming a pre-training criterion based on the AST 218 and a convolutional layer of the TBCNN 220 explicitly capturing various neighboring features on the AST 218, where binary continuous tree and 3-way pooling can enable processing of the AST 218 of different shapes and sizes. Resultantly, the TBCNN 220 can output a set of identified optimizations 222. Note that although the TBCNN 220 is used, the system 200 can employ another artificial neural network (ANN), such as a convolution neural network (CNN) or others. Further, note that the ANN (e.g., CNN, TBCNN) can be technically beneficial relative to a rule-based system because the rule-based system is time consuming and laborious to create. Further, note that training or executing the ANN can be computationally intensive (e.g., processor, memory, bandwidth). As such, at least some of these operations can be adapted for parallelism and ported to an open standard for parallel programming (e.g., OpenCL). Once ported to open standard for parallel programming, the system 200 can then be adapted to use dynamic acceleration with specialized hardware (DASH) system, resulting in even higher performance.

Since the multistage compiler now knows what has been optimized in the set of assembly language 214, the multistage compiler can be programmed to de-optimize the AST 218 based on the set of identified optimizations 222. In particular, the TBCNN 220 inputs the set of identified optimizations 222 into the de-optimizer 224. For example, the de-optimizer 224 can include a library of code transformations targeted towards compiler specific optimizations. If the set of identified optimizations 222 includes an identified optimization pattern (e.g., certain group of nodes in the AST 218 is indicative of for loop unrolling), then that branch/nodes would be replaced with an un-optimized equivalent thereof, as sourced from the de-optimizer 224 or availed to the de-optimizer 224. For example, if the set of identified optimizations 222 includes a for loop unroll pattern, then that branch/nodes would be replaced with an un-optimized equivalent thereof. For example, a library of transformations (e.g., rewriting or replacing compiler optimizations) can be applied to an AST. Each transformation can target a different compiler optimization that a neural network was trained to detect. At least some training data generated and used can guide at least some development of the library of transformations. Since the TBCNN can be trained using optimized and un-optimized ASTs, then how a transformation can alter a given tree can be determined. As such, the de-optimizer 224 can be programmed (e.g., abstract syntax tree transformation library) to output a transformed AST 226, which can differ, in structure or in function, from the AST 218 with replaced nodes of un-optimized equivalents. For example, the transformed AST 226 is sourced from the AST 218 but having at least one optimized node from the AST 218 being replaced with at least one de-optimized node sourced from the de-optimizer 224. For example, the de-optimizer 224 can be programmed to rewrite or replace a first node (optimized) of the AST 218 with a second node (de-optimized), where the first node is functionally or structurally equivalent to the second node. For example, the TBCNN 220 can correlate various structural features of the AST 218 to various compiler optimizations for a creation the transformed AST 226, which can be used to produce a high-level source code written in C++ or another high level language (e.g., Fortran, Basic).

The de-optimizer 224 inputs the transformed AST 226 into the back end 228, which outputs the set of source code 206 that was used to compile the application binary 202 or that is more indicative of the set of source used to compile the application binary 202 based on the text or the alphanumeric string, as determined/predicted/forecasted/estimated by the pre-processor 208. For example, the de-optimizer 224 can be programmed to rewrite or modify the AST 218 (compiler optimized) into the AST 226 (compiler de-optimized) that more closely resembles a structure of the set of source code 206. The transformed AST 226 can then be passed to an IR generator of a Clang compiler back end when the multistage compiler is embodied as such. The IR generator can produce the IR of the application binary 202 or the set of machine code 210. The back end 228 outputs the set of source code 206 that was used to compile the application binary 202 or that is more indicative of the set of source used to compile the application binary 202 based on the text or the alphanumeric string, as determined/predicted/forecasted/estimated by the pre-processor 208. For example, the transformed AST 226 functions as the IR of the set of source code 206 that was used to compile the application binary 202 or that is more indicative of the set of source code 206 used to compile the application binary 202. For example, if the multistage compiler is LLVM, then since LLVM can be programmed to have numerous backends (e.g., x86, ARM, C, C++, Fortran, BASIC) and each backend can be programmed to produce an architecture-specific binary based on the text or the alphanumeric string, as determined/predicted/forecasted/estimated by the pre-processor 208, then, whether additionally or alternative to producing an executable binary file that runs on an specific machine (e.g., 32-bit, 64-bit), the back end 228 can be programmed to output the set of source code 206 that was used to compile the application binary 202 or that is more indicative of the set of source code 206 used to compile the application binary 202 or the set of machine code 210. For example, if the back end 228 is embodied a Clang compiler back end, then the Clang compiler back end can be programmed to use the IR and to generate a target-specific high level source code based on the text or the alphanumeric string, as determined/predicted/forecasted/estimated by the pre-processor 208.

In one mode of operation, a processor of the server 108 can be programmed to identify a predetermined machine code string (e.g., code artifact, code snippet, debug symbol, library dependency, library name, compiler identifier, compiler signature) embedded in a binary file (e.g., the application binary 202). The processor can be programmed to disassemble the binary file such that an assembly language set (e.g., the set of assembly language 214) is generated, where the assembly language set corresponds to the executable binary file. The processor can be programmed to input the assembly language set to a front end (e.g., the front end 216) of a multistage compiler such that the front end generates an abstract syntax tree (e.g., the AST 218) of the executable binary file, where the multistage compiler includes a back end (e.g., the back end 228). The predetermined machine code string can be indicative of a high level language utilized to generate the executable binary file or a library utilized to generate the executable binary file. The front end can be programmed to output an intermediate representation inclusive of the abstract syntax tree. The executable binary file can be selected via a client (e.g., the client 102) in communication with the server, where the high level source code is accessible to the client.

The processor can be programmed to input the abstract syntax tree into an artificial neural network (e.g., ANN) such that the artificial neural network identifies a compiler optimization (e.g., the set of compiler optimizations 222) in the executable binary file based on the abstract syntax tree. For example, the ANN can include a CNN, a tree based TBCNN 220, or others. For example, the CNN can include a coding layer, a dynamic pooling layer, an output layer, and a convolutional layer, where the abstract syntax tree includes a structural feature, wherein the compiler optimization is identified based on: inputting, by the processor, the abstract syntax tree to the coding layer such that a set of feature vectors is generated; inputting, by the processor, the set of feature vectors to the convolutional layer such that the structural feature is identified; inputting, by the processor, the structural feature into the dynamic pooling layer such that a vector from the structural feature is generated; and inputting, by the processor, the vector to the output layer such that the compiler optimization is identified. The ANN can be trained with a training dataset containing a known optimized abstract syntax tree or a known un-optimized abstract syntax tree representation. The compiler optimization can include a loop optimization or a machine-independent optimization.

The processor can be programmed to de-optimize (e.g., the de-optimizer 224) the abstract syntax tree such that the compiler optimization is removed and a transformed abstract syntax tree (e.g., the transformed AST 226) is generated without the compiler optimization. The abstract syntax tree can include a first node associated with the compiler optimization, where the abstract syntax tree is de-optimized inclusive of: replacing, by the processor, the first node with a second node corresponding a piece of non-optimized logic and retrieving, by the processor, an element from a library of transformation to replace the second node.

The processor can be programmed to input the transformed abstract syntax tree to the back end such that the back end generates a high level source code (e.g., the high level source code 206) based on the predetermined machine code string, where the high level source code corresponds to the binary file. The high level source code can be an instruction set agnostic source code. The multistage compiler can include a middle end, where the transformed abstract syntax tree is fed into the back end inclusive of: receiving, by the processor, an intermediate representation of the executable binary file from the middle end, where the intermediate representation is based on the transformed abstract tree; and inputting, by the processor, the intermediate representation into the back end such that the back end generates the high level source code, where the middle end includes the artificial neural network, wherein the middle end is programmed to de-optimize the abstract syntax tree. The high level source code can include a piece of code corresponding to the predetermined machine code string. The back end can be dedicated to generate the high level source code.

Figure 3:
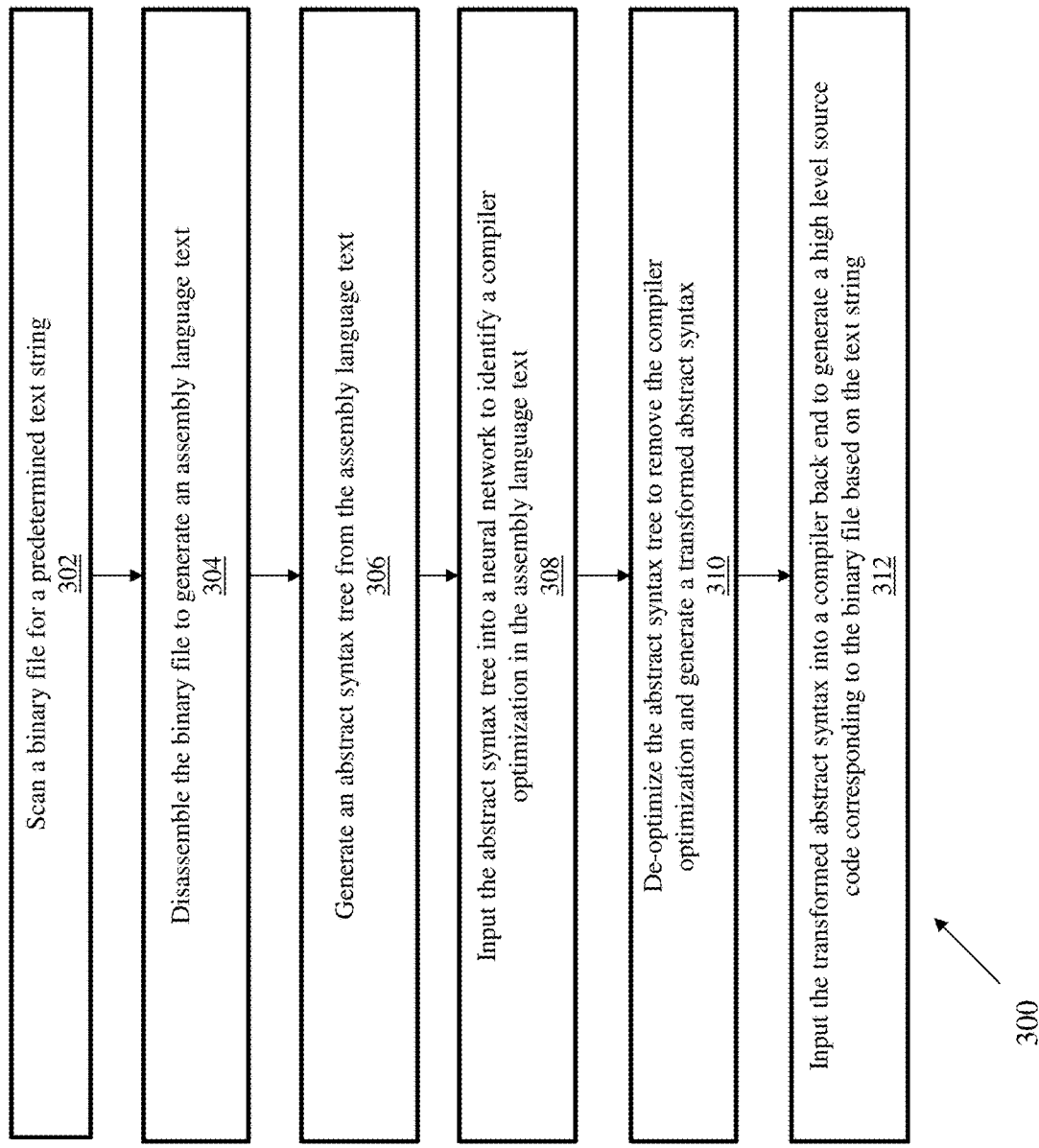
FIG. 3 shows a flowchart of an embodiment of a method for generating a high level source code from an executable binary, according to an embodiment.

FIG. 3 shows a flowchart of an embodiment of a method for generating a high level source code from an executable binary according to this disclosure. In particular, a method 300 includes a plurality of blocks 302-312, which can be performed via the system 100 and the system 200. In block 302, a binary file is scanned for a predetermined text string. This is explained above in context of the pre-processor 208. In block 304, the binary file is disassembled to generate an assembly language text. This is explained above in context of the disassembler 212. In block 306, an abstract syntax tree is generated from the assembly language text. This is discussed above in context of the front end 216. In block 308, the abstract syntax tree is input into a neural network to identify a compiler optimization in the assembly language text. This is discussed above in context of the TBCNN 220. In block 310, the abstract syntax tree is de-optimized to remove the compiler optimization and generate a transformed abstract syntax without the compiler optimization. This is discussed above in context of the de-optimizer 224. In block 312, the transformed abstract syntax is input into a compiler back end to generate a high level source code corresponding to the binary file based on the text string. This is discussed above in context of the back end 228.

Figure 4:
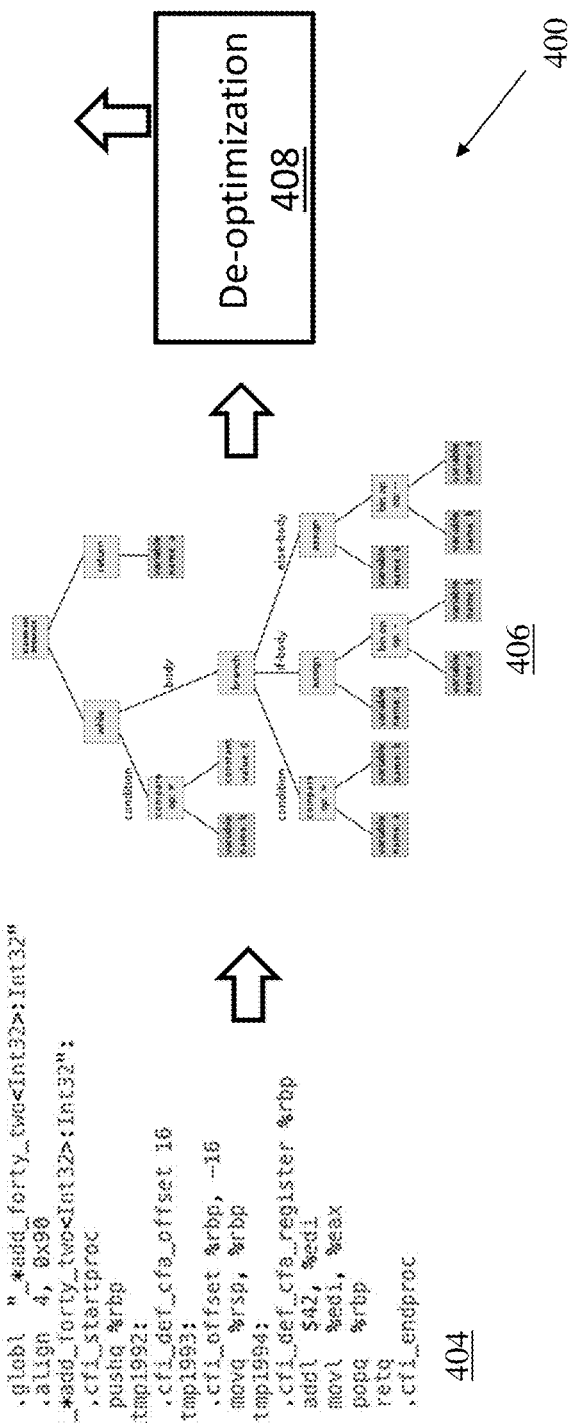
FIG. 4 shows a diagram an embodiment of a conversion process, according to an embodiment.

FIG. 4 shows a diagram an embodiment of a conversion process according to this disclosure. In particular, a system 400 depicts a set of data organization corresponding to the system 200. The system 400 includes a plurality of blocks 402-410. The block 402 corresponds to the set of machine code 210. The block 404 corresponds to the set of assembly language 214. The block 406 corresponds to the AST 218. The block 408 corresponds to the de-optimizer 224. The block 410 corresponds to the high level source code 206.

Note that the high level source code 206 can be further processed to identify code problems, vulnerabilities, security holes, or inefficiencies. Then, these code problems, vulnerabilities, security holes, or inefficiencies can be compared against a code bank/knowledge base storing various suggestions, enhancements, recommendations, or improvements corresponding to the code problems, vulnerabilities, security holes, or inefficiencies. Then, the suggestions, enhancements, recommendations, or improvements can be presented on the user interface 104 (e.g., popup, hover over, slide-out, tooltip, wizard). If a target compilation computing architecture is known, then the suggestions, enhancements, recommendations, or improvements can be further refined or customized for the target compilation computing architecture. Note that code bank/knowledge base can be hosted via the server 108 or remotely and can be updated periodically (e.g., every few minutes, hours, days, weeks, months). Additionally, if desired, then the high level source code 206 can be converted into another high level language (e.g., from C++ to Java) via the server 108.

Various embodiments of the present disclosure may be implemented in a data processing system suitable for storing and/or executing program code that includes a processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via an entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
    identifying, by a hardware processor, a predetermined machine code string embedded in a binary file;
    disassembling, by the hardware processor, the binary file such that an assembly language set is generated;
    inputting, by the hardware processor, the assembly language set to a front end of a multistage compiler such that the front end generates an abstract syntax tree, wherein the multistage compiler includes a back end;
    inputting, by the hardware processor, the abstract syntax tree into an artificial neural network such that the artificial neural network identifies a compiler optimization in the abstract syntax tree;
    de-optimizing, by the hardware processor, the abstract syntax tree such that the compiler optimization is removed and a transformed abstract syntax tree is generated without the compiler optimization; and
    inputting, by the hardware processor, the transformed abstract syntax tree to the back end such that the back end generates a high level source code based on the predetermined machine code string, wherein the high level source code corresponds to the binary file.

2. The method of claim 1, wherein the artificial neural network is a convolutional neural network.

3. The method of claim 2, wherein the convolution neural network is a tree based convolutional neural network.

4. The method of claim 2, wherein the convolutional neural network includes a coding layer, a dynamic pooling layer, an output layer, and a convolutional layer, wherein the abstract syntax tree includes a structural feature, wherein the compiler optimization is identified based on:
    inputting, by the hardware processor, the abstract syntax tree to the coding layer such that a set of feature vectors is generated;
    inputting, by the hardware processor, the set of feature vectors to the convolutional layer such that the structural feature is identified;
    inputting, by the hardware processor, the structural feature into the dynamic pooling layer such that a vector from the structural feature is generated; and
    inputting, by the hardware processor, the vector to the output layer such that the compiler optimization is identified.

5. The method of claim 1, further comprising:
    training, by the hardware processor, the artificial neural network with a training dataset containing a known optimized abstract syntax tree.

6. The method of claim 1, further comprising:
    training, by the hardware processor, the artificial neural network with a training dataset containing a known un-optimized abstract syntax tree.

7. The method of claim 1, further comprising:
    training, by the hardware processor, the artificial neural network with a training dataset containing a known optimized abstract syntax tree and a known un-optimized abstract syntax tree.

8. The method of claim 1, wherein the abstract syntax tree includes a first node associated with the compiler optimization, wherein the abstract tree is de-optimized inclusive of:
   replacing, by the hardware processor, the first node with a second node corresponding a piece of non-optimized logic.

9. The method of claim 8, further comprising:
   retrieving, by the hardware processor, an element from a library of transformation to replace the second node.

10. The method of claim 1, wherein the compiler optimization includes a loop optimization.

11. The method of claim 1, wherein the compiler optimization include a machine-independent optimization.

12. The method of claim 1, wherein the high level source code is an instruction set agnostic source code.

13. The method of claim 1, wherein the multistage compiler includes a middle end, wherein the transformed abstract syntax tree is input into the back end inclusive of:
   receiving, by the hardware processor, an intermediate representation of the binary file from the middle end, wherein the intermediate representation is based on the transformed abstract syntax tree; and
   inputting, by the hardware processor, the intermediate representation into the back end such that the back end generates the high level source code, wherein the middle end includes the artificial neural network, wherein the middle end is programmed to de-optimize the abstract syntax tree.

14. The method of claim 1, wherein the predetermined machine code string is indicative of a high level language utilized to generate the binary file.

15. The method of claim 1, wherein the predetermined machine code string is indicative of a library utilized to generate the binary file.

16. The method of claim 1, wherein the high level source code includes a piece of code corresponding to the predetermined machine code string.

17. The method of claim 1, wherein the hardware processor is included in a server, wherein the binary file is selected via a client in communication with the server, wherein the high level source code is accessible to the client.

18. The method of claim 1, wherein the front end is programmed to output an intermediate representation inclusive of the abstract syntax tree.

19. The method of claim 1, wherein the back end is dedicated to generate the high level source code.

20. A system comprising:
   a server comprising a hardware processor and memory programmed to:
   identify a predetermined machine code string embedded in a binary file;
   disassemble the binary file such that an assembly language set is generated;
   input the assembly language set to a front end of a multistage compiler such that the front end generates an abstract syntax tree, wherein the multistage compiler includes a back end;
   input the abstract syntax tree into an artificial neural network such that the artificial neural network identifies a compiler optimization in the abstract syntax tree;
   de-optimize the abstract syntax tree such that the compiler optimization is removed and a transformed abstract syntax tree is generated without the compiler optimization; and
   input the transformed abstract syntax tree to the back end such that the back end generates a high level source code based on the predetermined machine code string, wherein the high level source code corresponds to the binary file.

* * * * *